United States Patent
Forster

(10) Patent No.: US 10,671,150 B2
(45) Date of Patent: Jun. 2, 2020

(54) DATA PROCESSING

(71) Applicant: Sony Interactive Entertainment Inc., Tokyo (JP)

(72) Inventor: Richard James Forster, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/280,515

(22) Filed: Feb. 20, 2019

(65) Prior Publication Data

US 2019/0258310 A1    Aug. 22, 2019

(30) Foreign Application Priority Data

Feb. 22, 2018 (GB) .................................. 1802889.4

(51) Int. Cl.
| | |
|---|---|
| G06F 3/00 | (2006.01) |
| A63F 13/213 | (2014.01) |
| H04N 5/232 | (2006.01) |
| G06T 19/00 | (2011.01) |

(52) U.S. Cl.
CPC ............ *G06F 3/005* (2013.01); *A63F 13/213* (2014.09); *G06T 19/003* (2013.01); *H04N 5/23227* (2018.08)

(58) Field of Classification Search
CPC ........ G06F 3/017; G06F 3/0304; G06F 3/012; G06F 3/011; G06F 3/0325; A63F 13/213; A63F 2300/1087
USPC ................................ 463/36; 345/156; 348/47
See application file for complete search history.

(56) References Cited

U.S. PATENT DOCUMENTS

| | | | | |
|---|---|---|---|---|
| 2010/0105475 A1* | 4/2010 | Mikhailov | .............. | A63F 13/06 463/33 |
| 2010/0144436 A1* | 6/2010 | Marks | .................... | A63F 13/28 463/36 |
| 2014/0226058 A1 | 8/2014 | Muraki | | |

FOREIGN PATENT DOCUMENTS

JP         2013059014 A       3/2013

OTHER PUBLICATIONS

Combined Search and Examination Report for corresponding GB Application No. 1802889.4, 3 pages, dated Jul. 30, 2018.

* cited by examiner

*Primary Examiner* — Koosha Sharifi-Tafreshi
(74) *Attorney, Agent, or Firm* — Matthew B. Dernier, Esq.

(57) ABSTRACT

A system comprises a display object having a characteristic of its display configured to change with time in a timing calibration operation; a plurality of video cameras configured to capture images of the display object; and a data processing apparatus comprising a detector configured to detect timing differences in the capture of images by the plurality of video cameras indicative of a change in the characteristic of the display object and to apply the detected timing differences as a timing correction so as to time-align images captured by the plurality of cameras after the timing calibration operation.

14 Claims, 11 Drawing Sheets

DATA PROCESSING

BACKGROUND

Field of the Disclosure

This disclosure relates to data processing.

Description of the Prior Art

Some data processing activities may be controlled by a detection of a trackable device, for example.

An example arrangement involves a games machine, in which movements of a device such as a head mountable display (HMD) and/or a hand-holdable controller such as a Sony® Move® Controller, can be tracked by one or more cameras. In a so-called mixed reality system (for example, being capable of combining features of real and virtual environments in a display presented to the user), it may be that multiple cameras are in use, for example a camera to obtain images of the user, for example in order to track the user's position and/or activity, and one or more cameras to capture images of the user's real environment. There is a need to be able to synchronise or time-align the captured images obtained from the various cameras.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
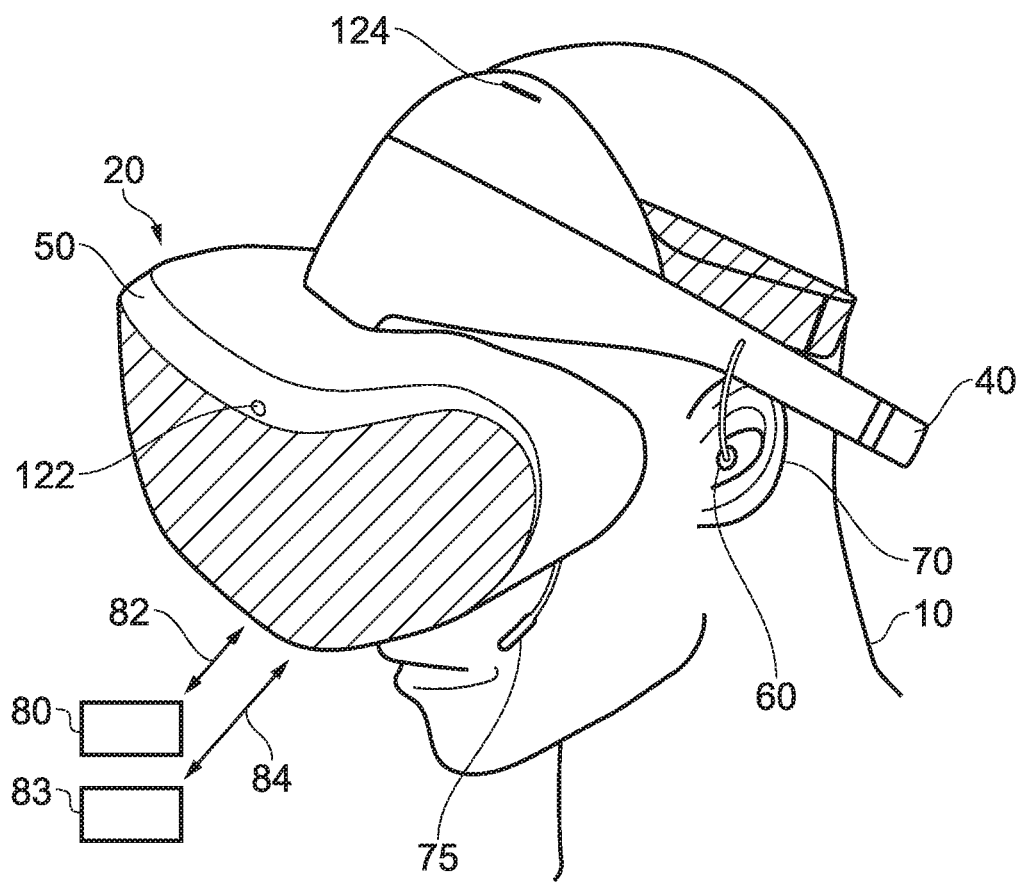
FIG. 1 schematically illustrates an HMD worn by a user.

Referring now to FIG. 1, a user 10 is wearing an HMD 20 (as an example of a generic head-mountable apparatus or virtual reality apparatus). The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes. A boom microphone 75 is mounted on the HMD so as to extend towards the user's mouth.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
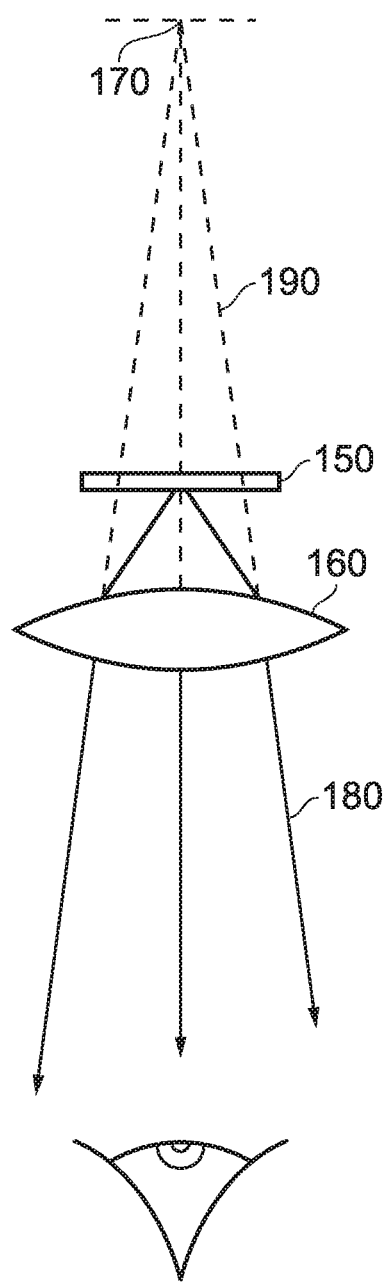
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
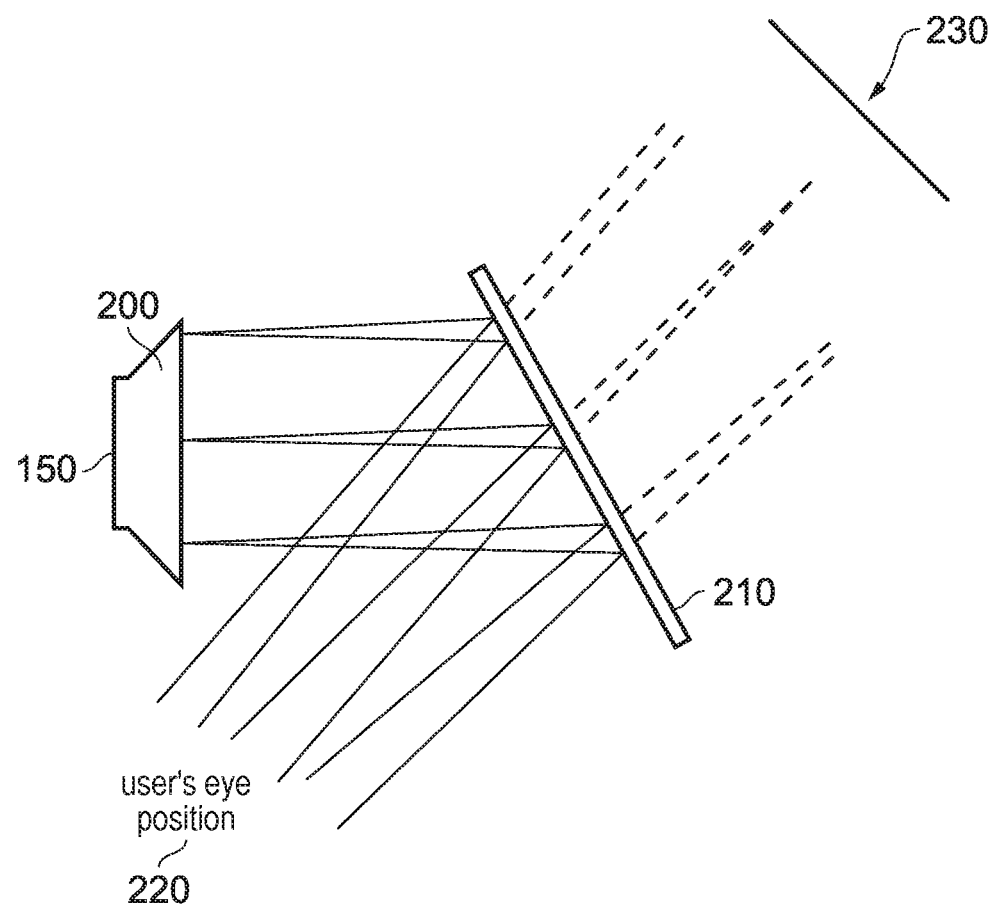
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
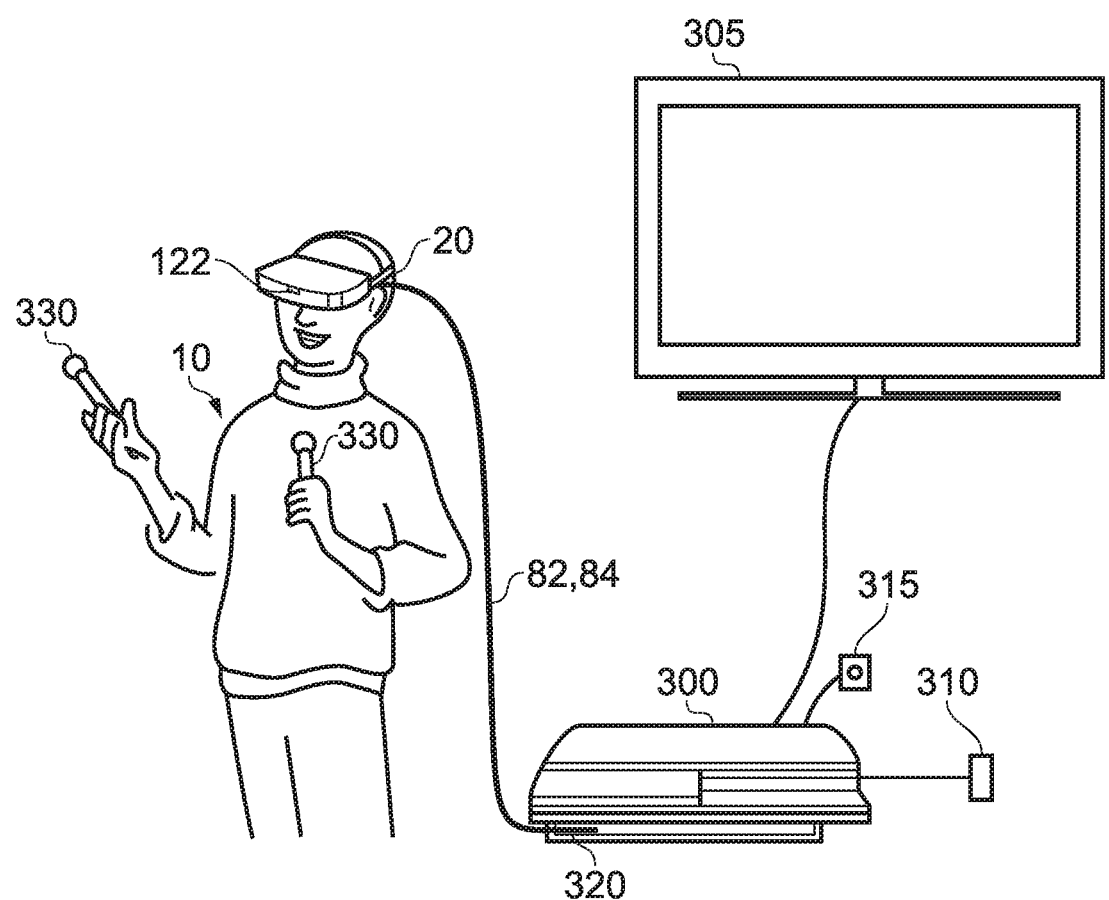
FIGS. 6 and 7 schematically illustrate a user wearing an HMD connected to a Sony® PlayStation 3® games console.

FIG. 6 schematically illustrates an example virtual reality system and in particular shows a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84. In FIG. 6, the user is also shown holding a pair of hand-held controller 330s which may be, for example, Sony® Move® controllers which communicate wirelessly with the games console 300 to control (or to contribute to the control of) game operations relating to a currently executed game program.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

FIG. 6 also shows a separate display 305 such as a television or other openly viewable display (by which it is meant that viewers other than the HMD wearer may see images displayed by the display 305) and a camera 315, which may be (for example) directed towards the user (such as the HMD wearer) during operation of the apparatus. An example of a suitable camera is the PlayStation Eye camera, although more generally a generic "webcam", connected to the console 300 by a wired (such as a USB) or wireless (such as WiFi or Bluetooth) connection.

The display 305 may be arranged (under the control of the games console) to provide the function of a so-called "social screen". It is noted that playing a computer game using an HMD can be very engaging for the wearer of the HMD but less so for other people in the vicinity (particularly if they are not themselves also wearing HMDs). To provide an improved experience for a group of users, where the number of HMDs in operation is fewer than the number of users, images can be displayed on a social screen. The images displayed on the social screen may be substantially similar to those displayed to the user wearing the HMD, so that viewers of the social screen see the virtual environment (or a subset, version or representation of it) as seen by the HMD wearer. In other examples, the social screen could display other material such as information relating to the HMD wearer's current progress through the ongoing computer game. For example, the HMD wearer could see the game environment from a first person viewpoint whereas the social screen could provide a third person view of activities and movement of the HMD wearer's avatar, or an overview of a larger portion of the virtual environment. In these examples, an image generator (for example, a part of the functionality of the games console) is configured to generate some of the virtual environment images for display by a display separate to the head mountable display.

Figure 7:
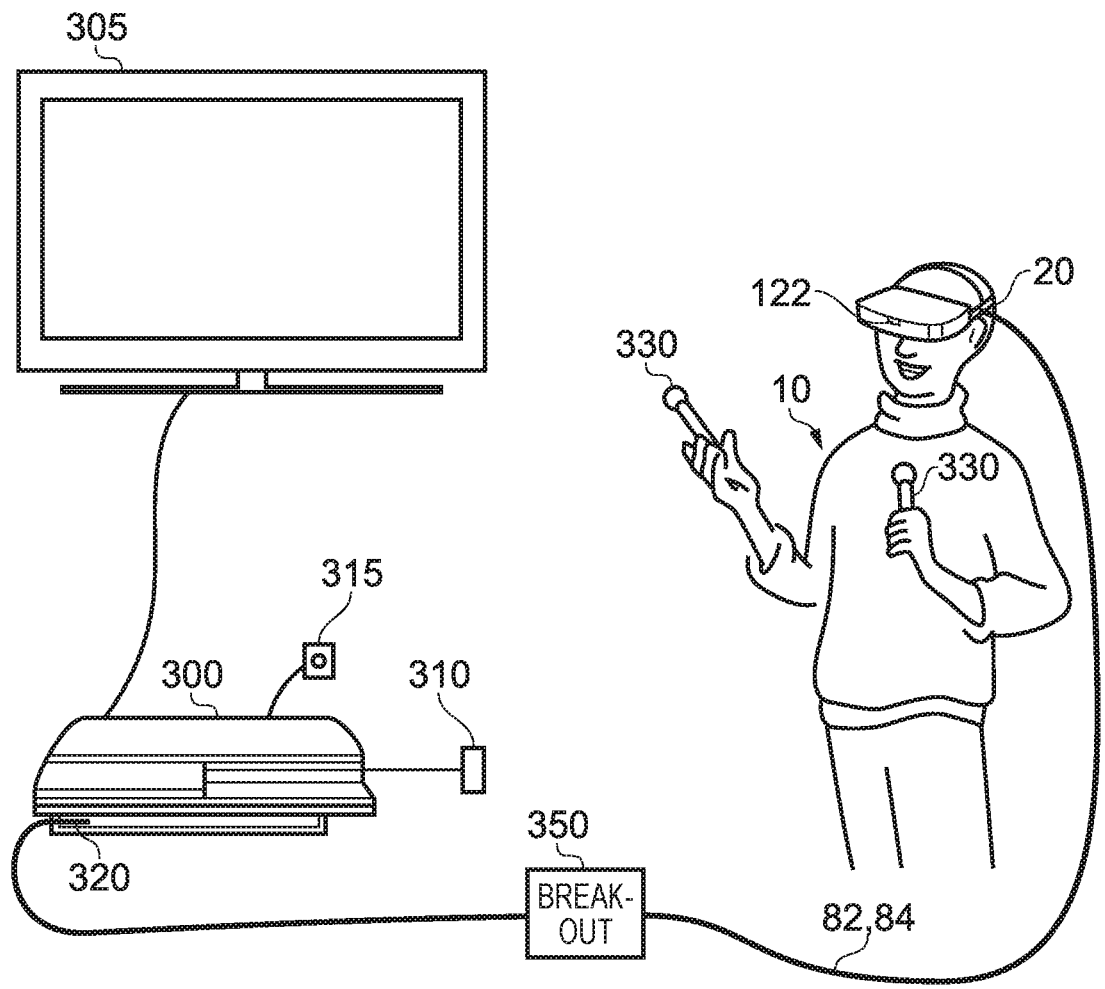

FIG. 7 schematically illustrates a similar arrangement (another example of a virtual reality system) in which the games console is connected (by a wired or wireless link) to a so-called "break out box" acting as a base or intermediate device 350, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
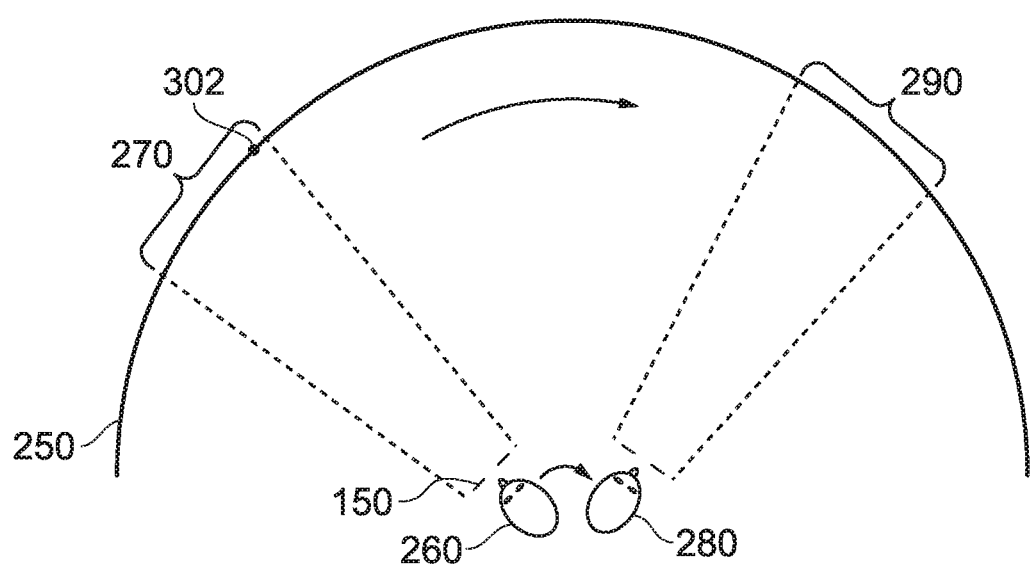
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. This provides an example of a virtual display screen (VDS). Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD. It can be seen from the drawing that the VDS subsists in three dimensional space (in a virtual sense) around the position in space of the HMD wearer, such that the HMD wearer sees a current portion of VDS according to the HMD orientation.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
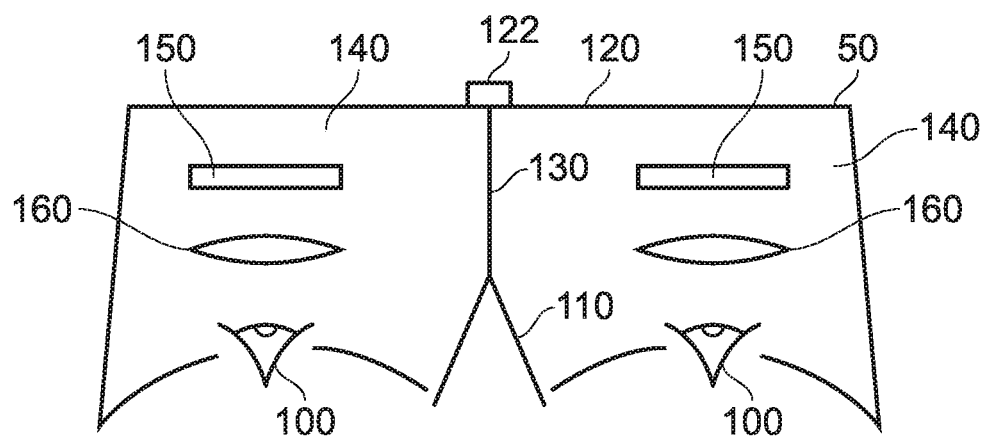
FIG. 2 is a schematic plan view of an HMD.
Figure 9A:
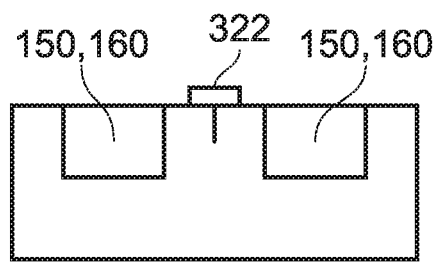
FIGS. 9a and 9b schematically illustrate HMDs with motion sensing.
Figure 9B:
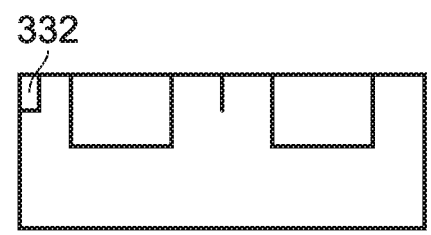

FIGS. 9*a* and 9*b* schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9*a*, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. In example arrangements, the motion detector comprises a camera mounted so as to move with the frame; and an image comparator operable to compare successive images captured by the camera so as to detect inter-image motion.

FIG. 9*b* makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
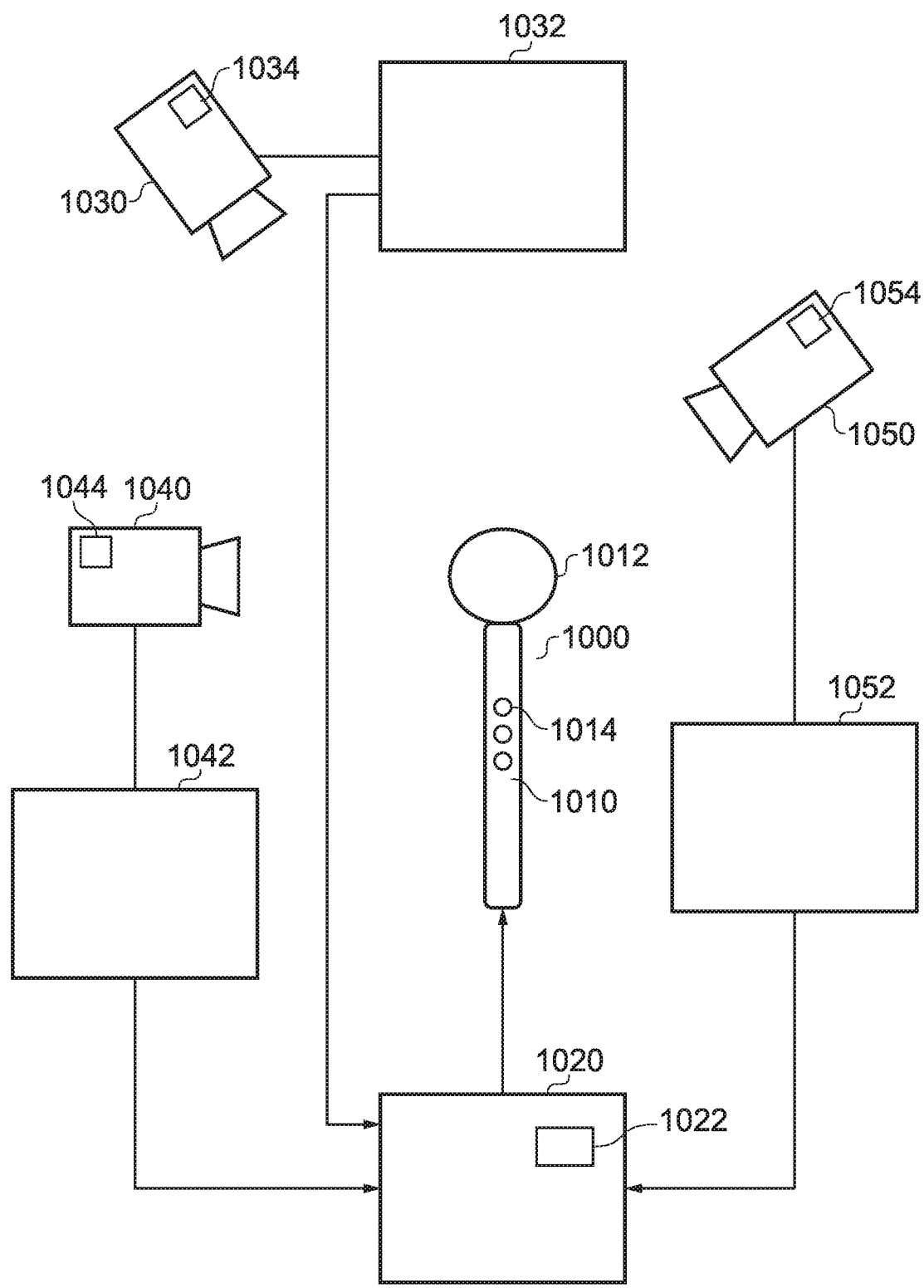
FIG. 10 schematically illustrates a data processing system.

FIG. 10 schematically illustrates a system comprising a display object 1000, which in this example is embodied by a Move controller such as the Move controller 330 of FIGS. 6 and 7. The display object could alternatively be, for example, a display screen, a mobile device, an illumination device (in which case, fast-responding illumination devices such as LEDs can be advantageous) or the like.

The Move controller comprises a handle portion 1010 and an illuminated end portion 1012. The handle portion 1010 can carry one or more control buttons 1014. The illuminated end portion 1012 comprises one or more light emitting diodes (LEDs) inside a translucent spherical shell and which are capable of being illuminated, for example under the control of an apparatus 1020 such as a games console similar to the games console 300 of FIG. 7, in two or more different colours. This provides an example of a display object 1000 having a characteristic of its display, such as a display colour, which is configured to change with time.

At least during a timing calibration operation, the display characteristic (colour) is arranged to change with time. Example timing diagrams will be discussed below with reference to FIGS. 13 and 14. These changes can be directly controlled by the apparatus 1020 in real time, or a pattern of required changes for use in the timing calibration operation can be provided in advance from the apparatus 1020 to the display object 1000 such that the display object 1000 then executes that pre-arranged pattern or display changes. Alternatively the display object 1000 can be instructed or controlled, for example by the apparatus 1020, to execute a random or pseudo-random series of colour transitions.

A plurality of video cameras 1030, 1040, 1050 are provided to capture images of the display object 1000. In the present example, each video camera has associated control apparatus 1032, 1042, 1052, which again may be embodied as a respected computing apparatus or games console similar to the games console 300.

During the timing calibration operation, the control apparatus 1032, 1042, 1052 is configured to detect a change, with respects to a local timing source such as a video time code generator 1034, 1044, 1054 associated with the respective video camera, of the display characteristic in images captured by that video camera, and to provide a respected control message to the apparatus 1020 indicating a local time stamp applicable to the detected change.

The data processing apparatus 1020 comprises, as part of its functionality, a detector 1022 configured to detect timing differences in the captured images by the video cameras 1030, 1040, 1050 indicative of a change in the characteristic of the display object, and to apply the detected timing differences as a timing correction (for example, following the timing calibration operation) so as to time-align images captured by the plurality of cameras after the timing calibration operation. In the present example, the apparatus 1020 may detect these timing differences with reference to the control messages received from the control apparatus 1032, 1042, 1052 associated with each of the video cameras. In other examples, the apparatus 1020 may receive the images and associated timecodes (for each image) directly (or after some processing) from the cameras and make the detection from the images.

The timing calibration operation can be significant in, for example, a so-called mixed reality arrangement such as a video game arrangement, in which the apparatus 1020, or a games console such as the games console 300 associated with the apparatus 1020, is configured to generate a mixed reality video signal for display to a user 10 (for example via an HMD 20), in dependence upon images captured by at least some of the video cameras and images (which may be generated by the apparatus 1020) indicative of a virtual environment.

So, in FIG. 10, the display object 1000 may be a video games controller such as a Move controller and may comprise an illumination source (the end portion 1012 and the LEDs inside the end portion 1012) configured to generate illumination in at least two different colours. The apparatus 1020 may control the display characteristic of the display object.

Figure 11:
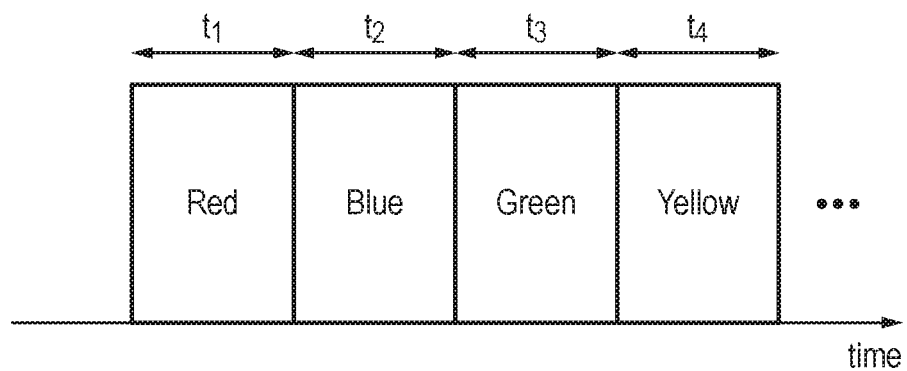
FIG. 11 schematically illustrates an illumination pattern.

FIG. 11 is a schematic timing diagram showing, with respects to a horizontal time axis, the successive display of different colours by the end portion 1012 representing changes in the display characteristic of the display object 1000. In the present example, successive periods $t_1$, $t_2$, $t_3$, $t_4$ ... are associated with respective display colours red, blue, green, yellow .... The length of each period $t_1$ ... $t_4$ can be the same from period to period or can vary, for example on a pseudo-random basis. The length of each period (or at least one or more of the periods) may be an integer multiple of a frame period of at least one of the video cameras or may be a different period, for example using a period which is specifically not an integer multiple of any individual frame period. These features will be discussed below. In some examples, the periods $t_1$ ... $t_4$ may be substantially equal to one frame period, but in other examples they could have a different length.

The ordering of the colours can be predetermined or can be random or pseudo-random, especially in respect of embodiments in which a detection is of a change in colour, rather than a detection of a particular colour. In other examples, instead of a change in colour, a change in brightness (for example between "on" and "not on") could be used as the variable aspect of the display object.

Figure 12:
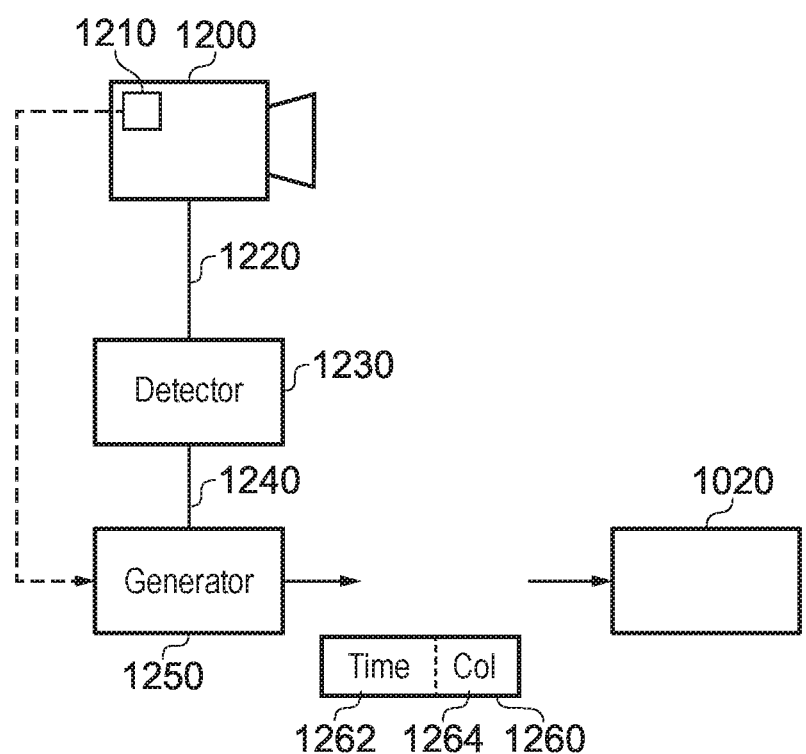
FIG. 12 schematically illustrates a part of a data processing system.

FIG. 12 schematically illustrates a part of the operation of one of the control apparatus 1032, 1042, 1052, in that the video camera 1200 representing one of the video cameras in FIG. 10 and having a local timing source 1210 provides images 1220, for example captured every 1/60 second, to a detector 1230. The detector 1230 detects one or both of a dominant colour within the captured image, and a colour of a predetermined location with respects to the end portion 1012 of the display object. The reason for this type of detection is that it is possible, particularly where the periods $t_1$ ... $t_4$ do not bear an integer multiple relationship to the frame period of the particular camera 1200 in use, that the display colour of the display object 1000 could change at the exact time that the video camera 1200 is acquiring image material from the image portion relating to the end portion 1012 of the display object 1000. This could in principle lead to a part of the display object 1000 (or at least its end portion 1012) being captured in one colour and a part in another colour using. Either the majority colour of the end portion 1012 or the colour at a particular position with respect to the end portion 1012 provides a definitive outcome for an unambiguous detection by the detector of the current display colour of the end portion 1012. The detector provides a signal 1240 indicative of the current colour (as determined above) of the end portion 1012 to a message generator 1250. The message generator is responsive to the local timing source 1210 to generate a message 1260 to be supplied to the apparatus 1020. For example, the message 1260 may indicate a time stamp 1262 and a newly detected colour 1264 with effect from that time stamp. The time stamp may express, for example, a local time code of a currently captured video frame according to the local timing source 1210.

It is not necessary that the colour 1264 is specified in the timing message 1260. The time stamp 1262 could simply relate to the time at which a change of display colour of the display object 1000 is detected.

The data processing apparatus 1020, and in particular the detector 1022 of FIG. 10, detects differences in the time stamps and uses these to detect timing discrepancies between the local timing sources 1034, 1044, 1054, which discrepancies can then be applied as timing corrections to subsequently captured video signals.

Figure 13:
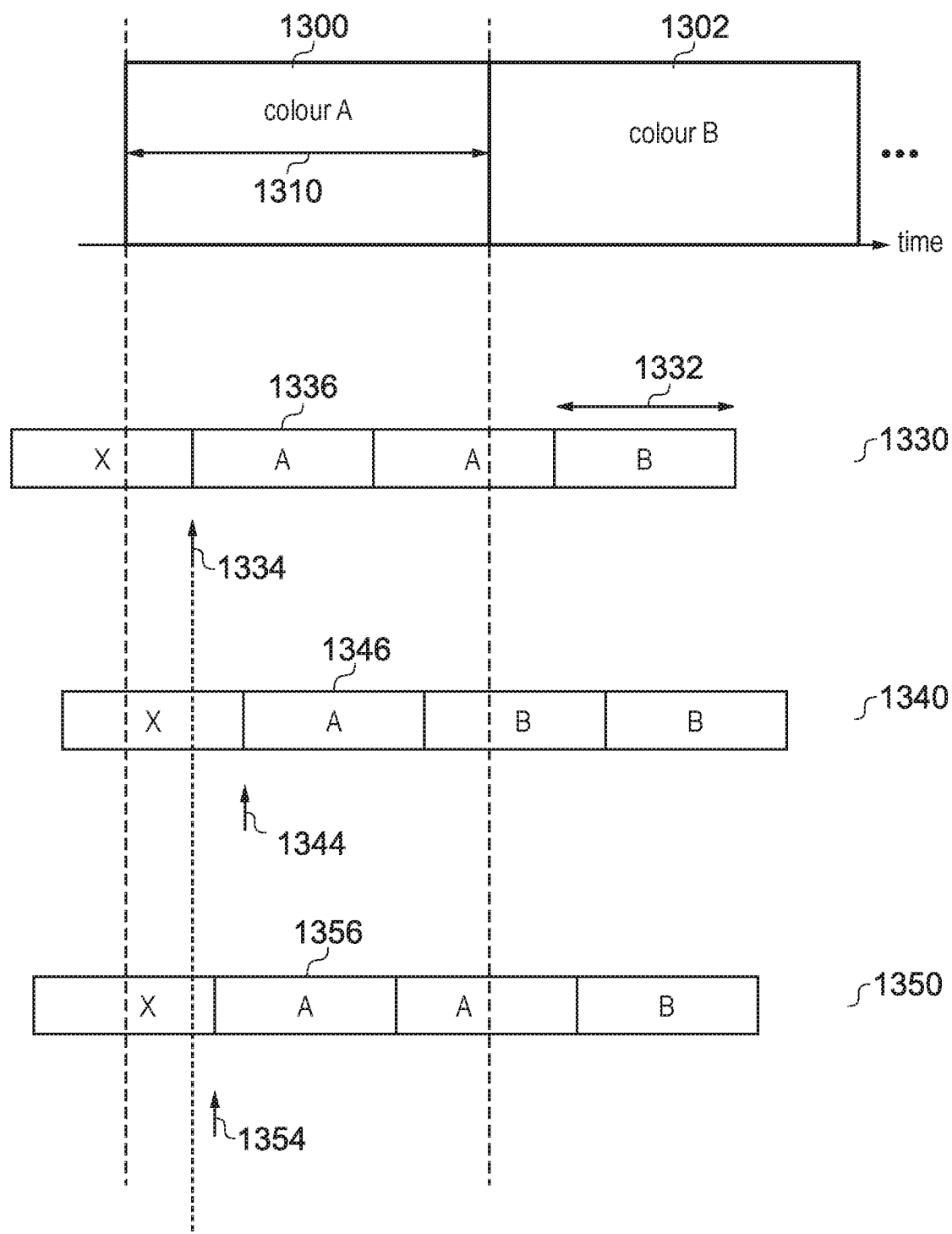
FIGS. 13 and 14 are schematic timing diagrams.

FIG. 13 is a schematic timing diagram, with time running from left to right as drawn.

An upper portion shows two example display colours, colour A and colour B (different to one another) successively displayed in respective periods 1300, 1302 by the display object 1000 (or at least the end portion 1012 of the display object 1000). In the example of FIG. 13, the period 1310 over which each colour is displayed is constant from colour to colour and is also a multiple (in this example, 2) of the video frame period of the cameras 1030, 1040, 1050. As an example, that video frame period may be 1/60 second and the period 1310 may be a multiple of one or more times that frame period.

Successive video frames captured by the cameras 1030, 1040, 1050 are shown as blocks 1330, 1340, 1350 respectively. Here, the horizontal extent of a block represents a frame period such as a period 1332. The colour as captured during each frame period, using the techniques discussed above relating to the unambiguous detection of the current colour of the end portion 1012, is indicated by a letter A, B associated with each frame period. Here, the designation "X" indicates "don't care" which is to say, for the purposes of this discussion, a colour preceding the colour A in the period 1300. Each control apparatus 1032, 1042, 1052 detects a respective frame period at which the colour changes to the colour A and provides a control message 1260 indicating, for example, a time stamp 1334, 1344, 1354 indicating, with respects to a local timing source, the time of the frame 1336, 1346, 1356 at which the colour as detected turns to the colour A. As mentioned above, it is not necessary that the control message includes the identity of the colour A; it can do so, but in other examples the control message 1260 can simple indicate the time of a detected change of colour.

Note also that in the series of frames 1340 the frame in which the colour B is first detected appears to start before the transition to the colour B by the display object. However, as discussed above, the spatial scanning nature of the captured images implies that even a change of colour which occurs after the start of the frame may mean that the new colour can be detected in the latter-scanned parts of the frame.

Given that the local timing sources 1034, 1044, 1054 are potentially independent and may have started counting when the respective camera 1030, 1040, 1050 was first switched on, the time stamps associated with the temporal positions 1334, 1344, 1354 may be radically different, for example (where ff is a frame number cycling from 0 to 59 in a 60 Hz system):

| Camera | Timestamp (hh:mm:ss:ff) |
|---|---|
| 1030 | T1 = 01:07:58:27 |
| 1040 | T2 = 00:21:32:17 |
| 1050 | T3 = 02:13:23:59 |

Alternatively, the timecode generators can be approximately synchronised with a broadcast synchronisation message before the present process, but given that this is only an approximate synchronisation, the timestamps in such an instance could be for example:

| Camera | Timestamp (hh:mm:ss:ff) |
|---|---|
| 1030 | T1 = 01:07:58:27 |
| 1040 | T2 = 01:07:58:24 |
| 1050 | T3 = 01:07:58:29 |

The data processing apparatus 1020 generates timing correction information as follows. In the example case that the data processing apparatus works according to one of the received timecodes, the corrections could be:

| Camera | Timing correction (TC) |
|---|---|
| 1030 | 0 (reference) |
| 1040 | TC = T2 − T1 |
| 1050 | TC = T3 − T1 |

In the case of a separate reference timecode Tref applicable at the time of the colour transition and local to the apparatus 1020, the corrections could be:

| Camera | Timing correction (TC) |
|---|---|
| 1030 | TC = T1 − Tref |
| 1040 | TC = T2 − Tref |
| 1050 | TC = T3 − Tref |

In principle, in an arrangement where the periods 1300, 1302 represent a multiple of the video frame period, it would be expected that the same timing differences are obtained at each colour transition. However, rather than simple executing the transition of one time in a timing calibration operation, the transition may be executed multiple times in order to obtain greater confidence in (an potentially greater accuracy in) the detected timing differences.

Figure 14:
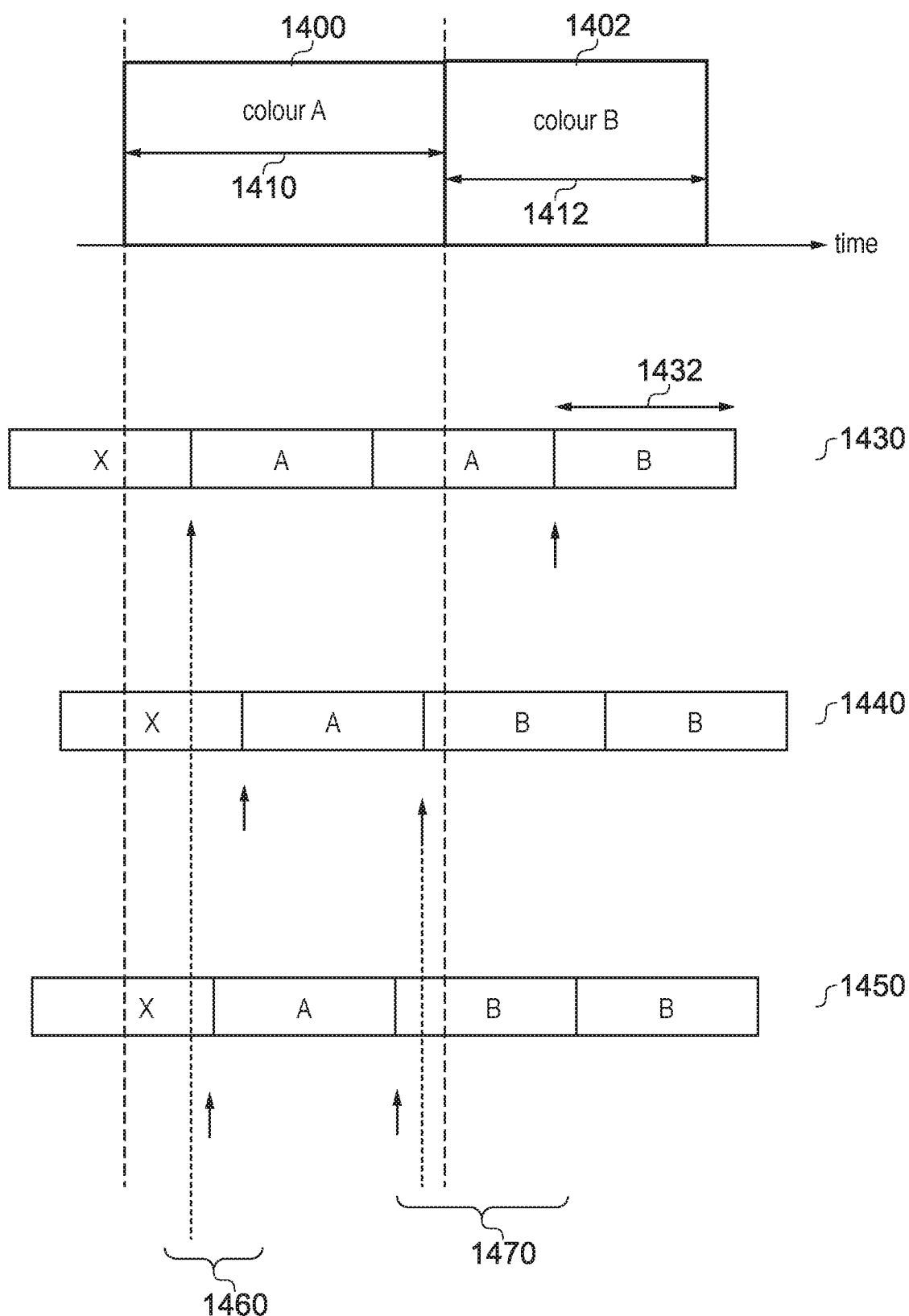

FIG. 14 schematically illustrates a similar timing diagram but in which the periods 1400, 1402 associated with successive colours not only have a length 1410 which is not an integer multiple of the video frame period 1432 but which potentially can vary from period to period (so that the length 1410 of the period 1400 can be different to the length 1412 of the period 1402 and so on).

In this example, the first transition 1460 is detected in a similar order to that shown in FIG. 13, in that the data 1430 from the camera 1030 shows the first transition to the colour A, followed by the data 1450 to the camera 1050, followed by the data from the camera 1040. However, at the second transition 1470, the first camera to detect the transition to the colour B is the camera 1050 represented by the data 1450, followed by the camera 1040 represented by the data 1440, followed by the camera 1030 represented by the data 1430. A different respective order may be expected at the end of the period 1402 when the colour changes to a further colour.

In this way, by deliberately not setting the periods 1410, 1412 to be an integer multiple of the frame period and by potentially allowing the appearance to change in length from period to period, a timing offset accurate to less than one frame period can be obtained.

Following the timing calibration operation, the apparatus 1020 applies (adding or subtracting, depending on the sense or polarity by which the correction has been generated) the respective correction to each frame received from each camera in a mixed reality mode of operation, so as to time-align the images captured by the plurality of cameras.

Figure 15:
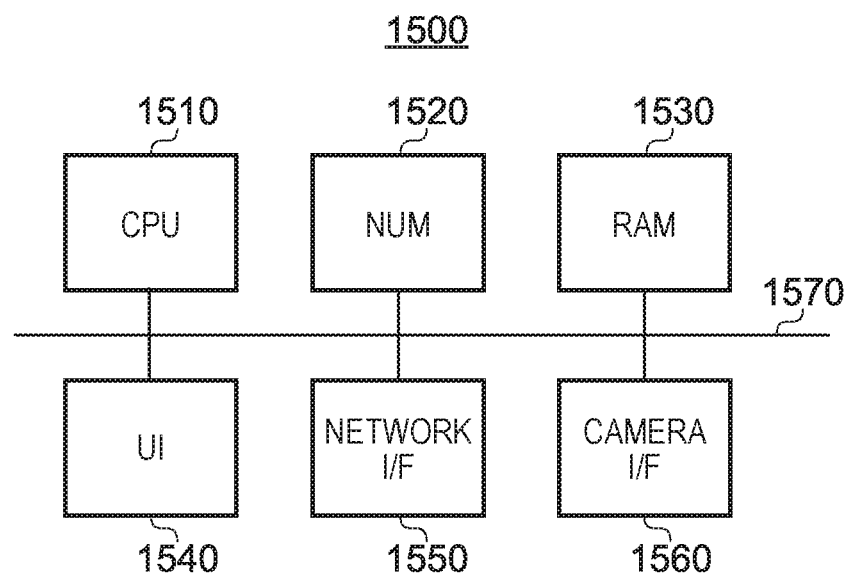
FIG. 15 schematically illustrates a system.

FIG. 15 schematically illustrates a data processing apparatus such as the apparatus 1020 or a control apparatus such as the apparatus 1032, 1042, 1052. The apparatus 1500 comprises one or more processing elements such as a central processing unit 1510 (CPU), a non-volatile memory 1520 such as a read only memory (ROM), a flash memory, a magnetic or optical disk or the like, a random access memory (RAM) 1530, a user interface 1540, a network interface 1550 to provide connectivity with different apparatus in the system, and (at least for the control apparatus') a camera interface 1560. All of these elements are interconnected by a bus structure 1570. In operation, program code is stored in the non-volatile memory 1520 and transferred to the random access memory 1530 for execution i.e. CPU 1510 to perform the functionality discussed above.

Note that although different apparatuses have been provided in the examples given above for the data processing apparatus 1020 and the earlier control apparatus', these functions could be shared by a common apparatus executing at various different tasks, for example.

Figure 16:
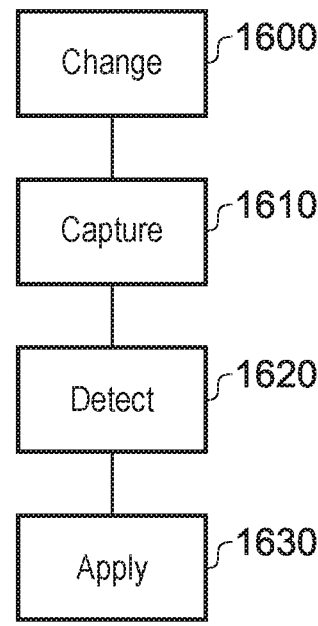
FIG. 16 is a schematic flowchart illustrating a method.

FIG. 16 is a schematic flowchart illustrating a method comprising:

changing (at a step 1600) a display characteristic of a display object with time in a timing calibration operation;

capturing (at a step 1610) images of the display object using a plurality of video cameras; and detecting (at a step 1620) timing differences in the capture of images by the plurality of video cameras indicative of a change in the characteristic of the display object; and applying (at a step 1630) the detected timing differences as a timing correction so as to time-align images captured by the plurality of cameras after the timing calibration operation.

It will be appreciated that in example embodiments the techniques discussed above, including the method of FIG. 16, can be implemented by computer software operating on a general purpose computing system such as a games machine which may have the form of the apparatus of FIG. 15. In these examples, computer software, which when executed by a computer, causes the computer to carry out any of the methods discussed above is considered as an embodiment of the present disclosure. Similarly, embodiments of the disclosure are provided by a non-transitory, machine-readable storage medium (such as the medium 1520) which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. A system comprising:
   a display object having a display characteristic configured to change with time in a timing calibration operation;
   a plurality of video cameras configured to capture images of the display object; and a data processing apparatus comprising a detector configured to detect timing differences in the capture of the images by the plurality of video cameras, which are indicative of a change in the display characteristic of the display object, and to apply the timing differences as a timing correction so as to time-align subsequent images captured by the plurality of cameras after the timing calibration operation.

2. The system according to claim 1, in which the display characteristic is a display colour.

3. The system according to claim 2, in which the display object is a video game controller.

4. The system according to claim 2, in which the display object comprises an illumination source configured to generate illumination in at least two different colours.

5. The system according to claim 1, in which the data processing apparatus is configured to control the display characteristic of the display object.

6. The system according to claim 5, in which the data processing apparatus is configured to change the display characteristic for respective successive periods of time.

7. The system according to claim 6, in which the successive periods of time have a same length.

8. The system according to claim 6, in which at least two of the successive periods of time have different respective lengths.

9. The system according to claim 6, in which the successive periods of time have a length equal to a multiple of a video frame period applicable to at least one of the plurality of video cameras.

10. The system according to claim 1, in which:
each respective one of the plurality of video cameras has an associated control apparatus configured to detect a change, with respect to a local timing source associated with the respective one of the plurality of video cameras, of the display characteristic in the images captured by the respective one of the plurality of video cameras, and to provide a respective control message to the data processing apparatus indicating a local timestamp applicable to the change detected; and
the data processing apparatus is configured to detect the timing differences with reference to control messages received from a respective control apparatus associated with each of the plurality of video cameras.

11. The system according to claim 1, in which the data processing apparatus is configured to generate a mixed reality video signal for display to a user in dependence upon the images captured by at least some of the plurality of video cameras and images indicative of a virtual environment.

12. The system according to claim 7, comprising a head-mountable display (HMD) to display the mixed reality video signal to the user.

13. A method comprising:
changing a display characteristic of a display object with time in a timing calibration operation;
capturing images of the display object using a plurality of video cameras; and
detecting timing differences in the capture of the images by the plurality of video cameras, which are indicative of a change in the display characteristic of the display object; and
applying the timing differences as a timing correction so as to time-align subsequent images captured by the plurality of cameras after the timing calibration operation.

14. A non-transitory, computer-readable storage medium containing computer software, which when executed by a computer, causes the computer to carry out actions, comprising:
changing a display characteristic of a display object with time in a timing calibration operation;
capturing images of the display object using a plurality of video cameras; and
detecting timing differences in the capture of the images by the plurality of video cameras, which are indicative of a change in the display characteristic of the display object; and
applying the timing differences as a timing correction so as to time-align subsequent images captured by the plurality of cameras after the timing calibration operation.

* * * * *